United States Patent
Welton et al.

(10) Patent No.: US 8,113,283 B2
(45) Date of Patent: *Feb. 14, 2012

(54) METHODS FOR IMPROVING LOW-QUALITY PROPPANT AND METHOD OF USING LOW-QUALITY PROPPANT IN SUBTERRANEAN OPERATIONS

(75) Inventors: Thomas D. Welton, Duncan, OK (US); Philip D. Nguyen, Duncan, OK (US); Matthew E. Blauch, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/777,896

(22) Filed: May 11, 2010

(65) Prior Publication Data

US 2010/0230099 A1    Sep. 16, 2010

Related U.S. Application Data

(63) Continuation-in-part of application No. 11/009,296, filed on Dec. 8, 2004, now Pat. No. 7,748,451.

(51) Int. Cl.
*E21B 43/04* (2006.01)
(52) U.S. Cl. ............................ 166/278; 166/276; 166/51
(58) Field of Classification Search .................. 166/276, 166/280.2, 281, 300, 308.5, 51, 278
See application file for complete search history.

(56) References Cited

U.S. PATENT DOCUMENTS

| | | | |
|---|---|---|---|
| 2,823,753 A * | 2/1958 | Henderson et al. ........... 166/295 |
| 6,311,773 B1 | 11/2001 | Todd | |
| 6,488,091 B1 | 12/2002 | Weaver et al. | |
| 6,725,931 B2 * | 4/2004 | Nguyen et al. ............. 166/280.2 |
| 7,040,403 B2 * | 5/2006 | Nguyen et al. ................. 166/281 |
| 7,131,491 B2 | 11/2006 | Blauch et al. | |
| 7,874,360 B2 | 1/2011 | Welton et al. | |
| 2005/0274517 A1 | 12/2005 | Blauch et al. | |
| 2005/0277554 A1 | 12/2005 | Blauch et al. | |
| 2010/0218947 A1 | 9/2010 | Welton et al. | |

OTHER PUBLICATIONS

Office Action for U.S. Appl. No. 11/009,296 dated Jan. 24, 2007.
Office Action for U.S. Appl. No. 11/009,296 dated Jul. 16, 2007.
Office Action for U.S. Appl. No. 11/009,296 dated Mar. 5, 2008.
Office Action for U.S. Appl. No. 11/009,296 dated Aug. 1, 2008.
Office Action for U.S. Appl. No. 11/009,296 dated Feb. 2, 2009.
Office Action for U.S. Appl. No. 11/009,296 dated Aug. 26, 2009.
Office Action for U.S. Appl. No. 11/009,296 dated Feb. 25, 2010.
Notice of Allowance and Notice of Allowability for U.S. Appl. No. 12/777,807 dated Dec. 3, 2010.

* cited by examiner

*Primary Examiner* — Nicole Coy
(74) *Attorney, Agent, or Firm* — Robert A. Kent; McDermott Will & Emery LLP

(57) ABSTRACT

The present invention relates to improved low-quality particulates and methods of making such improved particulates. A method of treating a portion of a subterranean formation, comprising providing a slurry comprising a treatment fluid and low-quality particulates at least partially coated with an aqueous tackifying composition, wherein the aqueous tackifying composition comprises an aqueous tackifier compound and an aqueous liquid; introducing the slurry into a subterranean formation; and, depositing the coated, low-quality particulates into the portion of this subterranean formation. A method of improving particulates, comprising at least partially coating low-quality particulates with an aqueous tackifying composition, wherein the aqueous tackifying composition comprises an aqueous tackifier compound and an aqueous liquid.

20 Claims, No Drawings

METHODS FOR IMPROVING LOW-QUALITY PROPPANT AND METHOD OF USING LOW-QUALITY PROPPANT IN SUBTERRANEAN OPERATIONS

CROSS-REFERENCE TO RELATED APPLICATIONS

This application is a continuation-in-part of U.S. patent application Ser. No. 11/009,296, filed Dec. 8, 2004 now U.S. Pat. No. 7,748,451, which is herein incorporated by reference in its entirety.

BACKGROUND

The present invention relates to particulates suitable for use in subterranean operations. More particularly, the present invention relates to improved low-quality particulates and methods of making such improved particulates.

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed in the zone. Particulate solids, such as graded sand, which are often referred to as "proppant" are suspended in a portion of the fracturing fluid and then deposited in the fractures when the fracturing fluid is converted to a thin fluid to be returned to the surface. These particulates serve, inter alia, to prevent the fractures from fully closing so that conductive channels are formed through which produced hydrocarbons can flow.

Hydrocarbon-producing wells may also undergo gravel packing treatments to reduce the migration of unconsolidated formation particulates into the well bore. In gravel packing operations, particulates, often referred to in the art as gravel, are carried to a well bore in a subterranean producing zone by a servicing fluid that acts as a gravel carrier fluid. That is, the particulates are suspended in a carrier fluid, which may be and usually is viscosified, and the carrier fluid is pumped into a well bore in which the gravel pack is to be placed. As the particulates are placed in or near the zone, the carrier fluid leaks off into the subterranean zone and/or is returned to the surface. The resultant gravel pack acts as a sort of filter to prevent the production of the formation solids with the produced fluids. Traditional gravel pack operations involve placing a gravel pack screen in the well bore before packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation. Gravel packs are used, among other reasons, to stabilize the formation while causing minimal impairment to well productivity.

In some situations, hydraulic fracturing and gravel packing operations may be combined into a single treatment. Such treatments are often referred to as "frac pack" operations. In some cases, the treatments are completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Currently, a variety of particulate materials are used in fracturing, gravel packing, and frac-packing operations. These include graded natural materials, such as sand or nut shells, or constructed materials, such as bauxite, ceramics, glasses, polymer particles, composite particles, and the like. Most common of these are high-quality graded natural sands, such as Ottawa or Brady sand. Unfortunately, high quality sands (particularly those having large grade sizes) are in short supply and are becoming increasingly costly. Lower quality particulates (such as locally occurring sands) could be used; however, such lower-quality particulates may not exhibit adequate physical properties and are thus often inadequate for use in subterranean operations.

SUMMARY

The present invention relates to particulates suitable for use in subterranean operations. More particularly, the present invention relates to improved low-quality particulates and methods of making such improved particulates.

A method of treating a portion of a subterranean formation, comprising providing a slurry comprising a treatment fluid and low-quality particulates at least partially coated with an aqueous tackifying composition, wherein the aqueous tackifying composition comprises an aqueous tackifier compound and an aqueous liquid; introducing the slurry into a subterranean formation; and, depositing the coated, low-quality particulates into the portion of this subterranean formation.

A method of propping a fracture in a portion of a subterranean formation, comprising providing a slurry comprising a treatment fluid and low-quality particulates at least partially coated with an aqueous tackifying composition, wherein the aqueous tackifying composition comprises an aqueous tackifier compound and an aqueous liquid; introducing the slurry into at least one fracture in the portion of the subterranean formation; and, depositing at least a portion of the low-quality particulates in the at least one fracture.

A method of gravel packing a portion of a well bore penetrating a subterranean formation, comprising providing a slurry comprising a treatment fluid and low-quality particulates at least partially coated with an aqueous tackifying composition, wherein the aqueous tackifying composition comprises an aqueous tackifier compound and an aqueous liquid; introducing the slurry into a portion of a well bore penetrating a subterranean formation; and, depositing at least a portion of the low-quality particulates in the portion of the well bore penetrating the subterranean formation so as to form a gravel pack therein.

A method of improving particulates, comprising at least partially coating low-quality particulates with an aqueous tackifying composition, wherein the aqueous tackifying composition comprises an aqueous tackifier compound and an aqueous liquid.

The features and advantages of the present invention will be readily apparent to those skilled in the art upon a reading of the description of the preferred embodiments that follows.

DETAILED DESCRIPTION

The present invention relates to particulates suitable for use in subterranean operations. More particularly, the present invention relates to improved low-quality particulates and methods of making such improved particulates.

In accordance with the present invention, low-quality particulates may be coated with an aqueous tackifier compound to improve the quality of the low-quality particulates. Such improvement may, inter alia, increase the conductivity of a resulting proppant pack or gravel pack made with the improved particulates. The aqueous tackifier may also help entrap small particles or "fines" that break off from the formation or from the low-quality particulates themselves, and in particular embodiments, may also make the low-quality particulates more resistant to crushing. The aqueous tackifier compounds of the present invention may be particularly useful for use with low-quality particulates, which might not have otherwise been suitable for use as proppants. In this way, the present invention may help provide a new source of particulates suitable for use in subterranean operations.

As used herein, the term "low-quality particulates" refers to particulates that do not meet at least one of the standards for sphericity, roundness, size, turbidity, acid solubility, percentage of fines, or crush resistance as recited in American Petroleum Institute Recommended Practices (API RP) standard numbers 56 and 58 (revision/edition 95 published June 2000) for proppant and gravel respectively.

The API RP's describe the minimum standard for sphericity as at least 0.6 and for roundness as at least 0.6. As used herein, the terms "sphericity" and "roundness" are defined as described in the API RP's and can be determined using the procedures set forth in the API RP's.

API RP 56 also sets forth some commonly recognized proppant sizes as 6/12, 8/16, 12/20, 20/40, 30/50, 40/70, and 70/140. Similarly, API RP 58 also sets forth some commonly recognized gravel sizes as 8/16, 12/20, 16/30, 20/40, 30/50, and 40/60. The API RP's further note that a minimum percentage of particulates that should fall between designated sand sizes, noting that not more than 0.1 weight % of the particulates should be larger than the larger sand size and not more than a maximum percentage (1 weight % in API RP 56 and 2 weight % in API RP 58) should be smaller than the small sand size. Thus, for 20/40 proppant, no more than 0.1 weight % should be larger than 20 U.S. Mesh and no more than 1 weight % smaller than 40 U.S. Mesh.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 58 describes the minimum standard for acid solubility of gravel as no more than 1 weight % loss when tested according to API RP 58 procedures. API RP 56 describes the minimum standard for crush resistance of proppant as producing not more than the suggested maximum fines as set forth in Table 1, below, for the size being tested:

TABLE 1

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
| --- | --- | --- | --- |
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |
| 30/50 | 12,566 | 4,000 | 10 |
| 40/70 | 15,708 | 5,000 | 8 |
| 70/140 | 15,708 | 5,000 | 6 |

Similarly, API RP 58 describes the minimum standard for crush resistance of gravel as producing not more than the suggested maximum fines as set forth in Table 1, below, for the size being tested:

TABLE 2

Suggested Maximum Fines for Gravel Subjected to Crushing Strength

| Mesh Size (U.S. Sieve Series) | Crushing Force (lbs) | Stress on Proppant (psi) | Maximum Fines (% by weight) |
| --- | --- | --- | --- |
| 8/16 | 6,283 | 2,000 | 8 |
| 12/20 | 6,283 | 2,000 | 4 |
| 16/30 | 6,283 | 2,000 | 2 |
| 20/40 | 6,283 | 2,000 | 2 |
| 30/50 | 6,283 | 2,000 | 2 |
| 40/60 | 6,283 | 2,000 | 2 |

By coating low-quality particulates with an aqueous tackifier compound, the methods of the present invention are able to transform otherwise unsuitable particulates into particulates suitable for use in subterranean operations. By way of example, turbidity is related to the level of fines or small particulates in a slurry. Coating of an aqueous tackifier compound on low-quality particulates may help entrap or encapsulate fines onto the surface of the particulate, thus reducing the amount of free fines and the turbidity level. Similarly, an aqueous tackifier coating may also help transform particulates from sources having an overly abundant percentage of fines into a suitable material due to the fact that the fines may tend to become entrapped in a portion of the aqueous tackifier that then is coated onto a more suitable size particulate. Moreover, since the low-quality particulates are coated with an aqueous tackifier, if any of the particulates are crushed it is less likely that pieces of crushed particulates will end up loose in the formation because the crushed pieces may be become stuck in the aqueous tackifier.

Particulates suitable for use in the present invention may be comprised of any material suitable for use in subterranean operations. Suitable particulate materials include, but are not limited to, sand; bauxite; ceramic materials; glass materials; polymer materials; TEFLON® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate", as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments. The methods of the present invention may be particularly well-suited for use with natural sand particulates.

The treated particulates of the present invention are at least partially coated with an aqueous tackifying composition that comprises an aqueous tackifier compound and an aqueous liquid. In some embodiments the particulates are coated with the aqueous tackifying composition in an amount ranging from about 0.1 to about 10% by weight of the particulates. In some embodiments the particulates are coated with the aqueous tackifying composition in an amount ranging from about 1 to about 4% by weight of the particulates.

The aqueous liquid used in the aqueous tackifying composition may be fresh water, salt water (e.g., water containing one or more salts dissolved therein), brine, seawater, or any other aqueous liquid that does not adversely react with the other components used in accordance with this invention or with the subterranean formation. Typically, the aqueous liquid is present in an amount of from about 0.1% to about 98% by weight of the aqueous tackifying composition. The aqueous tackifier compound used in the aqueous tackifying composition generally comprises a charged polymer that, when in an aqueous solution, will form a non-hardening coating and, when placed on a particulate, will increase the continuous critical resuspension velocity of the particulate when contacted by a stream of water (further described in Example 1, below). The aqueous tackifier compound enhances the grain-to-grain contact between the individual particulates within the formation (e.g., proppant particulates, formation fines, or other particulates), and may help bring about the consolidation of the particulates into a cohesive, flexible, and permeable mass.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. In particular embodiments, the aqueous tackifier compound comprises FDP-S706-03, a polyacrylate ester commercially available from Halliburton Energy Services, Inc., of Duncan, Okla. Additional information on suitable materials may be found in U.S. patent application Ser. Nos. 10/864,061 and 10/864,618, both filed Jun. 9, 2004, the relevant disclosures of which are hereby incorporated by reference. In some embodiments, the aqueous tackifier compound comprises from about 0.1% to about 40% by weight of the aqueous tackifying composition. In some embodiments the aqueous tackifier compound comprises from about 2% to about 30% by weight of the aqueous tackifying composition The aqueous tackifying compositions of the present invention may also include an activator used to activate (i.e., tackify) the tackifier compound. As used in the present invention, the term "tacky", in all of its forms, generally refers to a substance having a nature such that it is (or may be activated to become) somewhat sticky to the touch. Typically, the activator is an organic acid (or an anhydride of an organic acid that is capable of hydrolyzing in water to create an organic acid), an inorganic acid, an inorganic salt (such as a brine), a charged surfactant, a charged polymer, or a combination thereof. However, any substance that is capable of making the aqueous tackifier compound insoluble in an aqueous solution may be used as an activator in accordance with the teachings of the present invention. The choice of an activator may vary, depending on, inter alia, the choice of aqueous tackifier compound.

An example of one activator suitable for use in the present invention is an acetic acid/acetic anhydride blend. Other acids, acids salts, anhydrides, and mixtures thereof may be also suitable. In particular embodiments, the activation process may be analogous to coagulation. For example, many natural rubber latexes may be coagulated with acetic or formic acid during the manufacturing process. Suitable salts include, but are not limited to, sodium chloride, potassium chloride, calcium chloride, and mixtures thereof. In another exemplary embodiment of the present invention, the concentration of salts present in the formation water itself may be sufficient to activate the tackifier compound. In such an embodiment it may not be necessary to add an additional activator. Generally, when used, the activator is present in an amount in the range of from about 1% to about 40% by weight of the aqueous tackifying composition; however, in some cases (such as with brines) the activator may be present in excess. The amount of activator present in the aqueous tackifier compound may depend on, inter alia, the amount of aqueous tackifier compound present and/or the desired rate of reaction. Additional information on suitable materials may be found in U.S. patent application Ser. Nos. 10/864,061 and 10/864,618, both filed Jun. 9, 2004, the relevant disclosures of which are hereby incorporated by reference.

In particular embodiments, the aqueous tackifying composition of the present invention may further comprise a surfactant. Generally, a surfactant may facilitate the coating of an aqueous tackifier compound onto a particulate being treated. Typically, the aqueous tackifier compounds of the present invention preferentially attach to particulates having an opposite charge. For instance, an aqueous tackifier compound having a negative charge will preferentially attach to surfaces having a positive to neutral zeta potential and/or a hydrophobic surface. Similarly, using analogous chemistry, positively-charged aqueous tackifier compound will preferentially attach to negative to neutral zeta potential and/or a hydrophilic surfaces. Therefore, in particular embodiments of the present invention, a cationic surfactant may be included in the aqueous tackifying composition to facilitate the application of the negatively-charged aqueous tackifier compound to a particulate having a negative zeta potential. As will be understood by one skilled in the art, amphoteric and zwitterionic surfactants may also be used so long as the conditions they are exposed to during use are such that they display the desired charge. For example, in particular embodiments, mixtures of cationic and amphoteric surfactants may be used. In some embodiments, the surfactant is present in an amount of from about 0.1% to about 15% by weight of the aqueous tackifying composition. In some embodiments, the surfactant is present in an amount of from about 1% to about 5% by weight of the aqueous tackifying composition. Any surfactant compatible with the aqueous tackifying composition may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$-$C_{22}$ alkyl phosphonate surfactant may be preferred.

Once at least partially coated with the aqueous tackifying composition, the coated particulates are typically added to a treatment fluid (such as a fracturing fluid or gravel packing fluid) for placement into a subterranean formation. Generally, any treatment fluid suitable for a fracturing, graveling packing, or frac-packing application may be used in accordance with the teachings of the present invention, including aqueous gels, viscoelastic surfactant gels, oil gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the fracturing fluid to transport significant quantities of suspended proppant particles. The water used to form the treatment fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized", as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

To facilitate a better understanding of the present invention, the following examples of preferred embodiments are given. In no way should the following examples be read to limit or define the scope of the invention.

EXAMPLES

Example 1

A sample of 20/40 Brady Sand was treated (41.25% polyacrylate ester polymer concentrate, 3.75% 1:1 mixture of 19N Surfactant (a cationic surfactant available from Halliburton Energy Services, Duncan Okla.) and 0.1% HY-CLEAN (HC-2) Surfactant (an amphoteric surfactant available from Halliburton Energy Services, Duncan Okla.), 30% water. That treatment was then followed by solution of 25% activator (at about 2% (v/w) based on total treatment fluid volume) wherein the activator used was an acetic acid/acetic anhydride blend. This sample was then placed in a T-test as described as follows. The evaluation of a liquid or solution of a compound for use as a tackifying compound may be accomplished by the following test: First, a critical resuspension velocity is determined for the material upon which the tackifying compound is to be coated. One suitable test apparatus comprises a ½" glass tee that is connected to an inlet source of water and an outlet disposal line is blocked to fluid flow. A water-based slurry of particulates is aspirated into the tee through inlet and collected within portion by filtration against a screen. When portion of tee is full, the vacuum source is removed and a plug is used to seal the end of portion. The flow channel from inlet to outlet then is swabbed clean and a volumetrically controlled pump is connected to inlet and a controlled flow of water is initiated. The velocity of the fluid is slowly increased through inlet until the first particle of particulate material is picked up by the flowing water stream. This determines the baseline for the starting of the resuspension velocity. Next, the flow rate then is further increased until the removal of particles becomes continuous. This determines the baseline for the continuous resuspension velocity. Next, the test may then be terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test may be repeated to determine the starting point of particulate removal and the velocity at which removal becomes continuous. The percent of velocity increase (or decrease) then is determined based upon the initial or continuous baseline value.

Effectively treated proppant will resist transport as compared to untreated proppant. The test sample did not show signs of movement even when the test apparatus flowed at its maximum rate of 2,000 mL/min. Untreated 20/40 Brady Sand started flowing at 154 mL/min; the treated sand resisted flowing at fluid rates over 13-times faster than untreated sand.

Example 2

Two identical control tests (Control 1 and Control 2) were performed using 30/70-mesh Brady sand to determine the level of fines present in the untreated sand. For these tests, 50 grams of 30/70-mesh Brady sand were mixed in 100 mL of 3% KCl brine to create a slurry, and the slurry was put in a closed-lid container and stored in oven at 175° F. overnight at temperature. The next day, the sample was stirred and the sand was allowed to settle. The fluid was then drained from the slurry and the total solids in the drained fluid (that is, the fines in the fluid) were weighed. The results are shown in Table 3, below.

Next, two identical experimental tests (Exp. 1 and Exp. 2) were performed using 30/70-mesh Brady sand to determine the effect of aqueous tackifying compound has on entrapment of particulate fines. The 50 grams of 30/70-mesh Brady sand were coated with coated with 10 mL of an aqueous tackifying composition. The aqueous tackifying composition contained 0.1% HY-CLEAN (HC-2) Surfactant (available from Halliburton Energy Services, Duncan Okla.), 0.1% 19N Surfactant (available from Halliburton Energy Services, Duncan Okla.), 0.5% activator (acetic acid/acetic anhydride blend), 5% polymer (40% solution of a polyacrylate ester polymer), and 94.3% water). The coated sand was then mixed with 100 mL of 3% KCl brine and put in a closed-lid container and stored in oven at 175° F. overnight at temperature. The next day, the sample was stirred and the sand was allowed to settle. The fluid was then drained from the slurry and the total suspended solids in the drained fluid (that is, the fines in the fluid) were weighed. The results are shown in Table 3, below.

TABLE 3

| Series | Total Suspended Solid (mg/L) |
|---|---|
| Control 1 | 194 |
| Control 2 | 174 |
| Exp. 1 | 0 |
| Exp. 2 | 0 |

Table 1 clearly shows that the test run using particulates in contact with an activated aqueous tackifier showed no fines in the pulled off liquid verses the nearly 200 mg/L in the control experiments.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method comprising:
   providing a slurry comprising a treatment fluid and low-quality particulates, wherein the low-quality particulates do not meet at least one of the standards for sphericity, roundness, size, turbidity, acid solubility, percentage of fines, or crush resistance as recited in American Petroleum Institute Recommended Practices standard numbers 56 and 58 for proppant and gravel; and
   wherein the low-quality particulates are at least partially coated with an aqueous tackifying composition, wherein the aqueous tackifying composition comprises an aqueous liquid and an aqueous tackifier compound;
   and introducing the slurry into the subterranean formation; and
   depositing at least a portion of the low-quality particulates into the portion of the subterranean formation, wherein said aqueous tackifying composition does not harden in said formation.

2. The method of claim 1 wherein the low-quality particulates comprise natural sand.

3. The method of claim 1 wherein the low-quality particulates are coated with the aqueous tackifying composition in an amount ranging from about 0.1% to about 10% by weight of the low-quality particulates.

4. The method of claim 1 wherein the aqueous tackifier compound comprises from about 0.1% to about 40% by weight of the aqueous tackifying composition.

5. The method of claim 1 wherein the aqueous tackifying composition further comprises an activator.

6. The method of claim 5 wherein the activator comprises at least one of the following: an acetic acid/acetic anhydride blend, an organic acid, an anhydride of an organic acid, an inorganic acid, an inorganic salt, a charged surfactant, or a charged polymer.

7. The method of claim 5 wherein the activator comprises from about 1% to about 40% by weight of the aqueous tackifying composition.

8. The method of claim 1 wherein the aqueous tackifying composition further comprises a surfactant.

9. The method of claim 8 wherein the surfactant comprises at least one of the following: an ethoxylated nonyl phenol phosphate ester, a cationic surfactant, a non-ionic surfactant, or an alkyl phosphonate surfactant.

10. The method of claim 8 wherein the surfactant comprises from about 0.1% to about 15% by weight of the aqueous tackifying composition.

11. A method comprising:
providing a slurry comprising a treatment fluid and low-quality particulates, wherein the low-quality particulates do not meet at least one of the standards for sphericity, roundness, size, turbidity, acid solubility, percentage of fines, or crush resistance as recited in American Petroleum Institute Recommended Practices standard numbers 56 and 58 for proppant and gravel and wherein the low-quality particulates are at least partially coated with an aqueous tackifying composition, wherein the aqueous tackifying composition comprises an aqueous liquid and an aqueous tackifier compound;
and introducing the slurry into at least one fracture in a portion of the subterranean formation; and
depositing at least a portion of the low-quality particulates into the at least one fracture, wherein said aqueous tackifying composition does not harden in said formation.

12. The method of claim 11 wherein the low-quality particulates comprise natural sand.

13. The method of claim 11 wherein the low-quality particulates are coated with the aqueous tackifying composition in an amount ranging from about 0.1% to about 10% by weight of the low-quality particulates.

14. The method of claim 11 wherein the aqueous tackifier compound comprises from about 0.1% to about 40% by weight of the aqueous tackifying composition.

15. The method of claim 11 wherein the aqueous tackifying composition further comprises an activator.

16. The method of claim 15 wherein the activator comprises at least one of the following: an acetic acid/acetic anhydride blend, an organic acid, an anhydride of an organic acid, an inorganic acid, an inorganic salt, a charged surfactant, or a charged polymer.

17. The method of claim 15 wherein the activator comprises from about 1% to about 40% by weight of the aqueous tackifying composition.

18. The method of claim 11 wherein the aqueous tackifying composition further comprises a surfactant.

19. The method of claim 18 wherein the surfactant comprises at least one of the following: an ethoxylated nonyl phenol phosphate ester, a cationic surfactant, a non-ionic surfactant, or an alkyl phosphonate surfactant.

20. The method of claim 18 wherein the surfactant comprises from about 0.1% to about 15% by weight of the aqueous tackifying composition.

* * * * *